United States Patent
Villa et al.

(10) Patent No.: US 8,041,219 B2
(45) Date of Patent: Oct. 18, 2011

(54) OPTICAL NETWORK ELEMENT WITH BRILLOUIN EFFECT COLORLESS WAVELENGTH SHIFT

(75) Inventors: José Antonio Lázaro Villa, Barcelona (ES); Josep Joan Prat Gomá, Barcelona (ES); Mireia Esther Omella Cancer, Barcelona (ES)

(73) Assignee: Tellabs Operations, Inc., Naperville, IL (US)

( * ) Notice: Subject to any disclaimer, the term of this patent is extended or adjusted under 35 U.S.C. 154(b) by 808 days.

(21) Appl. No.: 12/023,116

(22) Filed: Jan. 31, 2008

(65) Prior Publication Data
US 2009/0196618 A1 Aug. 6, 2009

(51) Int. Cl.
*H04J 14/02* (2006.01)

(52) U.S. Cl. ............. 398/91; 398/71; 398/72; 398/176; 398/135; 398/183; 398/186; 398/99; 398/100; 359/332; 359/326; 359/344; 359/334; 385/14; 385/24; 372/32; 372/26; 372/50

(58) Field of Classification Search .......... 398/66, 398/67, 68, 69, 70, 71, 72, 98, 99, 100, 183, 398/186, 173, 174, 175, 176, 75, 79, 82, 398/91, 92, 135, 136, 157, 160; 359/326, 359/332, 334, 344; 385/14, 15, 24, 37, 131; 372/32, 26, 50
See application file for complete search history.

(56) References Cited

U.S. PATENT DOCUMENTS

| | | | |
|---|---|---|---|
| 5,917,179 A | 6/1999 | Yao | |
| 7,738,167 B2 * | 6/2010 | Kim et al. | 359/344 |
| 2004/0090661 A1 * | 5/2004 | Nicolaescu | 359/326 |
| 2005/0259997 A1 * | 11/2005 | Sternklar et al. | 398/186 |
| 2006/0210271 A1 * | 9/2006 | Mori | 398/71 |

FOREIGN PATENT DOCUMENTS

EP  0717516 A1  6/1996

OTHER PUBLICATIONS

European Patent Office: "Notification of Transmittal of the International Search Report and the Written Opinion . . . " for related application PCT/US2008/068253, mailed Oct. 10, 2008 (3 pgs).
European Patent Office: "International Search Report" for related application PCT/US2008/068253, mailed Oct. 10, 2008 (4 pgs).
European Patent Office: "Written Opinion of the International Searching Authority" for related application PCT/US2008/068253, mailed Oct. 10, 2008 (5 pgs).

(Continued)

*Primary Examiner* — Hanh Phan
(74) *Attorney, Agent, or Firm* — Davis & Associates; William D. Davis (57) ABSTRACT

A method of optical communication includes generating an amplified optical signal from at least a portion of a first optical signal having a first carrier wavelength, $\lambda_1$. The amplified optical signal is applied to Brillouin media to stimulate generation of a Brillouin effect signal at a wavelength $\lambda_2$. The Brillouin effect signal is modulated to produce a second optical signal having a second carrier wavelength, $\lambda_2$. In one embodiment, the first optical signal is a downstream optical signal and the second optical signal is an upstream optical signal of a passive optical network.

21 Claims, 10 Drawing Sheets

OTHER PUBLICATIONS

Chul Soo Park, et al: "Experimental Demonstration of 1.25 Gb/s Radio-Over-Fiber Downlink Using SBS-Based Photonic Upconversion", IEEE Photonics Technology Letters, IEEE Service Center, Piscataway, NJ, vol. 19, No. 22, Nov. 15, 2007 pp. 1828-1830.

Chul Soo Park, et al: "Photonic Frequency Upconversion by SBS-Based Frequency Tripling", Journal of Lightwave Technology, IEEE Service Center, New York, NY, vol. 25, No. 7, Jul. 1, 2007, pp. 1711-1718.

Yang Jing Wen, et al: "Light Sources for WDM Passive Optical Networks", COIN-ACOFT 2007: Joint International Conference on the Optical Internet and the 2007 32nd Australian Conference on Optical Fibre Technology, IEEE, Piscataway, NJ, Jun. 24, 2007, pp. 1-3.

I. Garces, et al: "Analysis of narrow-FSK downstream modulation in colourless WDM PONs", Electronics Letters, IEE STEVENAGE, GB, vol. 43, No. 8, Apr. 12, 2007, pp. 471-472.

Thierry Rampone, et al., "Semiconductor Optical Amplifier Used as an In-Line Detector with the Signal DC-Component Conserved", Journal of Lightwave Technology, vol. 16, No. 7, pp. 1295-1301, Jul. 1998.

Michael Connelly, "Semiconductor Optical Amplifiers and their Applications", (invited paper), 2nd Spanish National Meeting on Optoelectronics, OPTOEL'03, Madrid, Spain, Jul. 14-16, 2003.

Josep Prat, et al., "Optical Network Unit Based on a Bidirectional Reflective Semiconductor Optical Amplifier for Fiber-to-the-Home Networks," IEEE Photonics Technology Letters, vol. 17, No. 1, pp. 250-252, Jan. 2005.

Arellana, Cristina, "PONs Using Reflective Optical Network Units", MUSE Workshop on Optical Access Networks, Berlin, Germany, Oct. 14, 2005.

L. Xu, et a., "An integrated transceiver based on a reflective semiconductor optical amplifier for the active network", 2006 Annual Symposium of the IEEE/LEOS (Benelux Chapter), Eindhoven, The Netherlands, pp. 77-80, Nov. 30-Dec. 1, 2006.

\* cited by examiner

OPTICAL NETWORK ELEMENT WITH BRILLOUIN EFFECT COLORLESS WAVELENGTH SHIFT

TECHNICAL FIELD

This invention relates to the field of communications. In particular, this invention is drawn to methods and apparatus for optical communications.

BACKGROUND

Optical communications networks are used to transport large amounts of information attributable to voice, data, and video communications. These communications are in the form of optical signals carried by fiber optic cables.

Optical fiber might be used for long-haul transport between central office hubs of telecommunication providers. The optical fiber infrastructure has begun to encroach on traditional wireline infrastructure as optical fiber is extended closer to customer premises.

For example, fiber has been extended from the central office "to the curb", i.e., a service node near one or more customer buildings as a result of growing demand for increased bandwidth at a local level. The connection between individual buildings and the service node is completed with traditional wireline medium such as copper wires. An optical network unit (ONU) provided the optical-to-electrical and electrical-to-optical conversion required for interfacing the fiber portion of the network with the copper wire portion. The ONU communicates with an optical line terminal (OLT) at the central office.

Decreasing costs of fiber, increasing demand for bandwidth, and lower infrastructure costs have encouraged extension of the optical fiber all the way to the customer premises. An optical network terminal (ONT) terminates the fiber optic network at or near the customer premises and provides the interface between the optical network and any electrical media.

In order to appropriately direct communications between the appropriate customer premises and the OLT, each ONT may be assigned a unique communication channel. In one approach, the unique channel is realized as a specific timeslot of a time-division-multiplexed (TDM) optical signal. As the demand for greater bandwidth increases, a TDM timeslot becomes inadequate.

One approach for accommodating greater bandwidth is to provide a wavelength division multiplexed (WDM) network where each channel is distinguished by wavelength. The use of the same channel for upstream and downstream communications results in Rayleigh backscattering that impairs bidirectional communications on the same channel.

SUMMARY

A method of optical communication includes generating an amplified optical signal from at least a portion of a first optical signal having a first carrier wavelength, $\lambda_1$. The amplified optical signal is applied to Brillouin media to stimulate generation of a Brillouin effect signal at a wavelength $\lambda_2$. The Brillouin effect signal is modulated to produce a second optical signal having a second carrier wavelength, $\lambda_2$. In one embodiment, the first optical signal is a downstream optical signal and the second optical signal is an upstream optical signal of a passive optical network.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
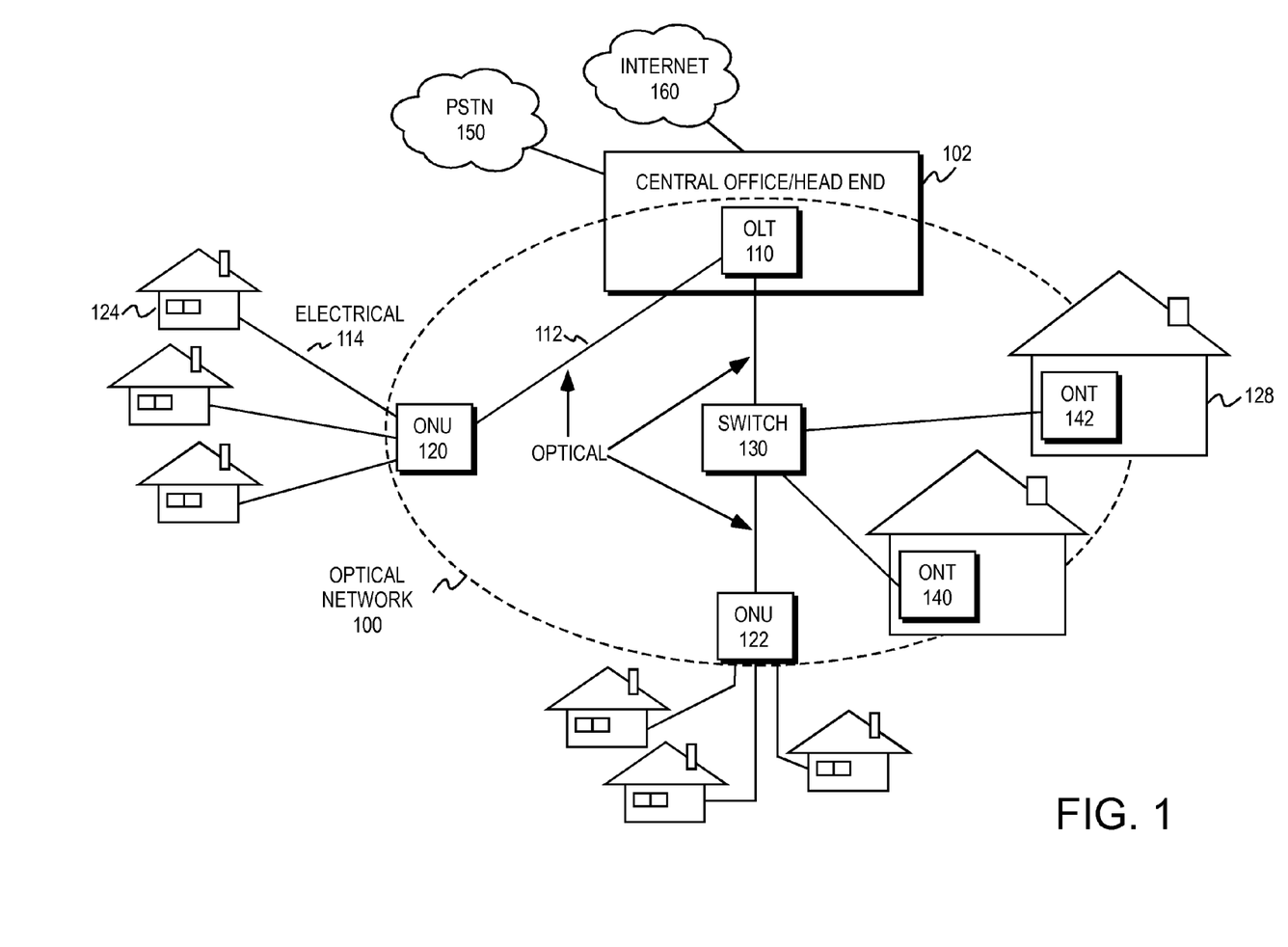
FIG. 1 illustrates one embodiment of a passive optical network architecture.

FIG. 1 illustrates one embodiment of a passive optical network 100. The optical network can include various network elements such as an optical line terminal (OLT 110), an optical switch 130, an optical network unit (ONU 120, 122), and optical network terminal (ONT 140, 142). The optical network may include various other elements such as amplifiers and repeaters which are not illustrated in this example.

The OLT is located at a telephone company central office or cable company head end 102. The OLT is the interface between the optical distribution network 100 and other networks such as a public telephone switching network (PSTN 150) or Internet 160.

Although each network element may perform electrical-to-optical conversions in order to achieve its intended function, the transmission media between the network elements within the optical network is optical. The OLT may be coupled to switches, ONUs, and ONTs via optical fibers such as optical fiber 112, for example.

Wavelength division multiplexing (WDM) is a technique that permits communication of multiple channels of information using the same communication media by assigning different channels of information to different wavelength carriers. In various embodiments, the OLT supports WDM such that channels are distinguished by carrier wavelength. In addition, each channel may be time-division multiplexed.

WDM is frequency division multiplexing. Frequency (f) and wavelength ($\lambda$) are inversely related as $\lambda f = c$, where c is the speed of light in the subject media. By convention, individual optical channels in WDM applications are usually identified by wavelength rather than frequency. Various WDM specifications can be distinguished by the number of channels and the spacing between channels identified in the specification. Although the channels themselves may be specified by wavelength, the spacing is often described in terms of frequency. Dense wave division multiplexing (DWDM), for example, might provide for a spacing of 50-100 GHz between carriers.

Communications are typically distributed within the customer premises (such as businesses or homes 124, 128) electrically. Thus at some demarcation point, an electrical-to-optical conversion is required. ONUs and ONTs both provide such a conversion. Telephone wiring and coaxial cable are examples of types of electrical media 114 used. The information carried by the optical network typically corresponds to video, data, or voice communications.

The primary distinctions between ONUs and ONTs relate to the number of premises supported and the location of the network element. An ONU 120 is typically located near, but not necessarily at the customer premises. An ONU supports several different premises. In contrast, an ONT 140 extends the optical distribution network all the way to the customer premises and typically serves only one or perhaps a very small number of premises.

Figure 2:
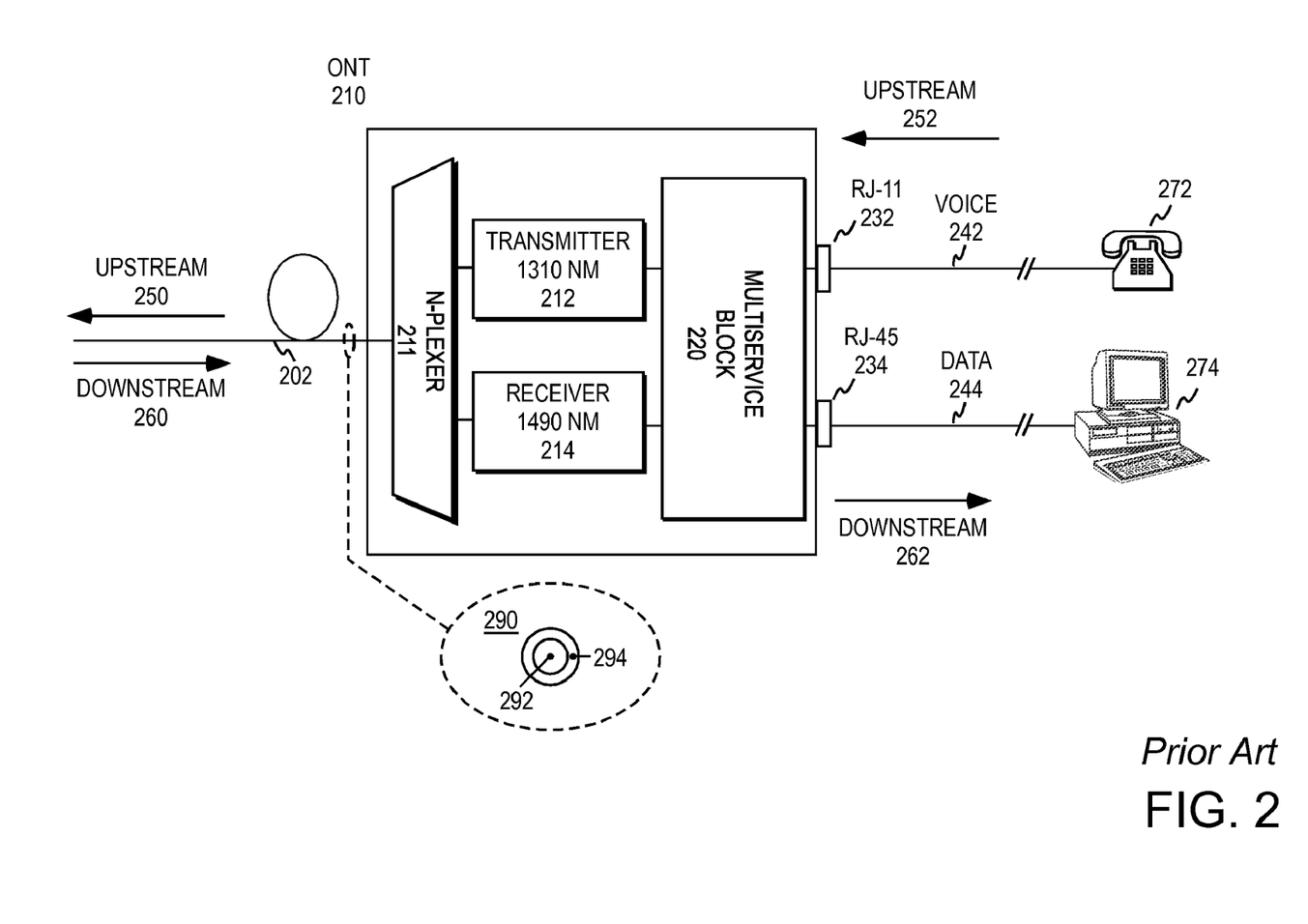
FIG. 2 illustrates an optical network terminal (ONT) using distinct WDM channels for upstream and downstream communication.

FIG. 2 illustrates one embodiment of a prior art optical network terminal (ONT 210). The illustrated configuration is a "fiber to the premises" optical network. In the illustrated embodiment, the ONT transports information attributable to voice and data communications.

Communications (upstream 250 and downstream 260) between the ONT and a central office headend are optical. The ONT terminates a first type of optical fiber 202 carrying upstream and downstream communications. In one embodiment, the first type of optical fiber 202 is a glass optical fiber (GOF). The glass optical fiber can be a single mode fiber or a multi-mode fiber.

Communications (upstream 252, downstream 262) between the ONT and subscriber equipment are electrical. The electrical signals may be carried by various electrical cabling including telephone wire (voice 242), coaxial cable, or other cabling (data 244). The ONT provides optical-to-electrical and electrical-to-optical conversion as well as other functionality required for interfacing the fiber portion of the network with the electrical portion of the network.

Multiservice block 220 provides the electrical interface with the subscriber equipment such as telephone 272 and computer 274. In the illustrated embodiment, the telephone and computer are electrically coupled to multiservice block via voice 242 and data 244 at connectors RJ-11 232, RJ-45 and 234, respectively.

In addition to handling voiceband communications, the multiservice block provides the appropriate POTS functions for subscriber equipment 272. For example, traditional subscriber line interface circuit (SLIC) functions must be provided at the secondary ONT 208 given that the communication between the central office and the ONT are otherwise optical rather than electrical. In one embodiment, the multiservice block 220 provides the BORSCHT functions (i.e., battery feed, overvoltage protection, ringing, supervision, codec, hybrid, and test).

As illustrated by callout 290, optical fiber 202 includes a core 292 and a cladding 294. The core and cladding have different refractive indices. An optical fiber 202 coupling the ONT to a distant upstream node such as a central office typically has a glass core and may be referred to as a glass optical fiber (GOF) based upon material of construction. In conjunction with wavelength division multiplexing, GOF can carry very large amounts of information between the customer premises and the central office.

In the illustrated embodiment, subscriber equipment such as telephones 272 and computers 274 are coupled to ONT 210 using different types of media. The type of media is dictated at least in part by electrical specifications associated with the related service.

For example, data 244 is often communicated on multiconductor data cables such as Ethernet cables for carrying digital signals. Plain old telephone system (POTS) equipment such as a telephone 272 typically uses copper wire pairs. Generally services provided to POTS equipment are referred to as voice 242. The term "voice" includes voiceband communications.

ONT 210 includes the appropriate physical connector to interface with the physical media for each service. For example, ONT 210 includes an RJ-11 connector 232 for voice services and an RJ-45 connector 234 for data services. ONT 210 provides the interface between the electrical and optical media. The customer premises may thus be wired with multiple media including POTS wiring and the appropriate data cabling to support the different services throughout the premises.

Upstream and downstream communications between the ONT and the central office share the same optical fiber media. Different services, however, may be associated with different wavelengths carried by the optical fiber. In one embodiment, however, the ONT is handling multiple services on the same wavelength. Channels and optical wavelengths may thus be provisioned based upon the content and direction of the communications among other factors.

In the illustrated embodiment, a first optical wavelength (1310 nm) is utilized for upstream voice and data. Another optical wavelength (1490 nm) is utilized for downstream voice and data. The optical signal carried by optical fiber 202 may thus be wavelength division multiplexed (WDM). In addition, the upstream and downstream channel may each be time-division-multiplexed to support the multiple services per channel.

An n-plexer 211 serves to aggregate optical signals generated by upstream transmitters 212 for upstream communications by optical fiber 202. The n-plexer also optically demultiplexes the incoming WDM optical signal to extract selected downstream channels for the associated receiver 214.

A multiservice block 220 provides the appropriate functionality for interfacing the ONT with the downstream subscriber equipment and the upstream optical network. For example, multiservice block 220 may include a media access control (MAC) to permit unique identification of the ONT by the upstream optical network.

In one embodiment, data and voice share the same upstream and downstream channels on the optical fiber 202. Upstream voice and data, for example, may be time division multiplexed on a common upstream channel. Similarly, voice and data may be time division multiplexed on a common downstream channel. The multiservice block demultiplexes downstream voice and data communications. The multiservice block multiplexes upstream voice and data communications from the subscriber equipment. Multiservice block 220 also provides the appropriate electrical interface for the subscriber equipment. For example, multiservice block 220 provides subscriber line interface circuit (SLIC) functionality to support subscriber equipment coupled to the voice connector 232.

This approach of FIG. 2 supports downstream communications at a pre-determined wavelength and upstream communications at another pre-determined wavelength. Depending upon the configuration of the network, each ONT may have to have a plurality of unique wavelengths allocated to it for upstream and downstream communications. This approach consumes channels rapidly.

Figure 3:
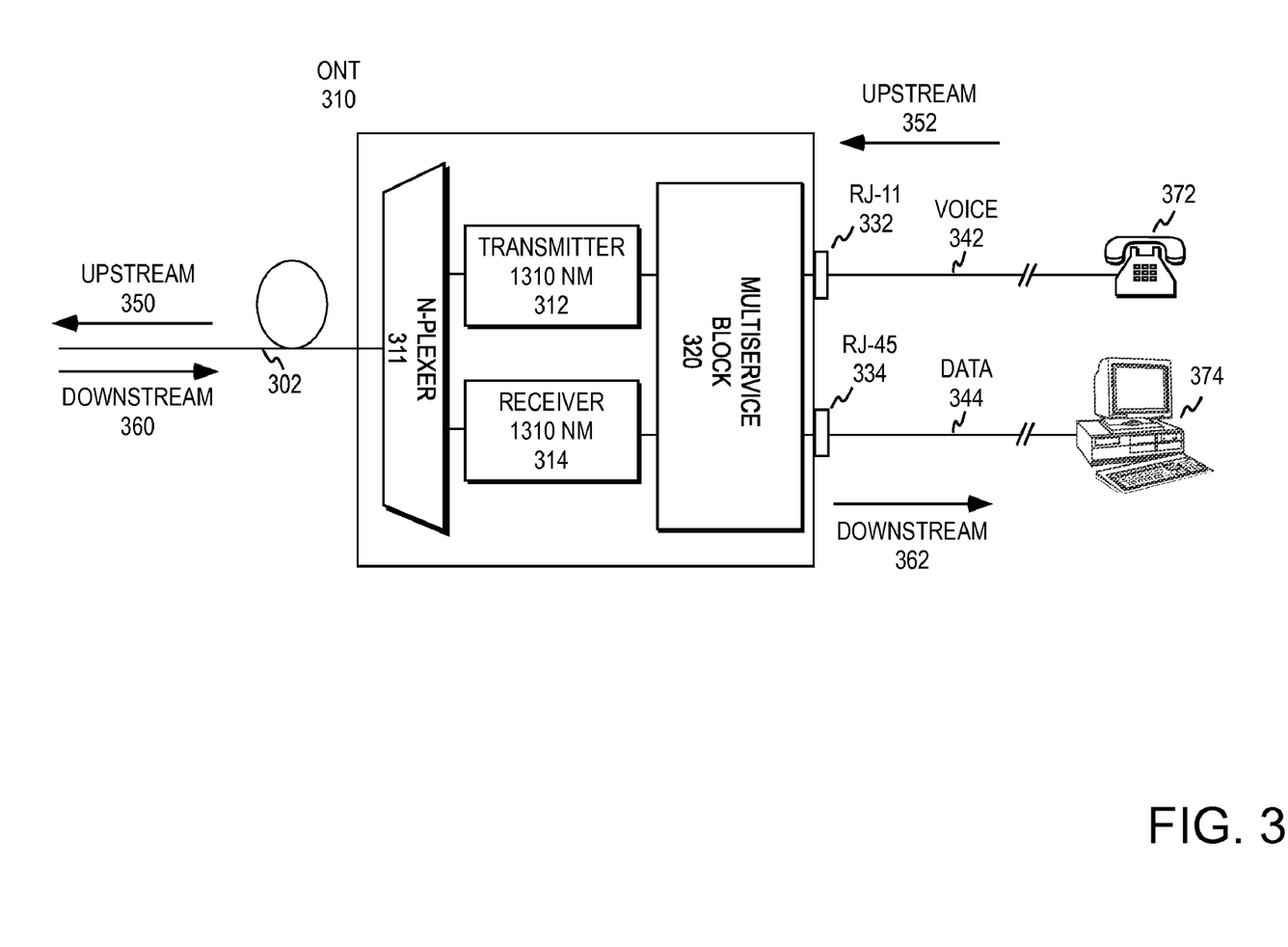
FIG. 3 illustrates one embodiment of an ONT using the same channel for upstream and downstream communications.

FIG. 3 illustrates an alternative approach where upstream and downstream communications use the same wavelength for one or more services. A first optical wavelength carrier (1310 nm) is utilized for upstream voice and data. The same optical wavelength carrier is utilized for downstream voice and data. The optical signal carried by optical fiber 302 may be a WDM signal. Alternatively, communications may take place on a non-WDM optical fiber 304.

An n-plexer 311 aggregates optical signals generated by one or more upstream transmitters 312 for upstream communications by optical fiber 302. The n-plexer also optically demultiplexes the incoming optical signal to extract selected channels for one or more associated receivers 314, if necessary.

In one embodiment, data and voice share the same upstream and downstream channels on the optical fiber 302. Upstream voice and data for the same premises, for example, may be time division multiplexed on a common upstream channel. Similarly, voice and data for the same premises may be time division multiplexed on a common downstream channel. The multiservice block 320 demultiplexes downstream voice and data communications. The multiservice block multiplexes upstream voice and data communications from the subscriber equipment.

Multiservice block 320 also provides the appropriate electrical interface for the subscriber equipment. Multiservice block 320 may include a MAC to permit unique identification of the ONT by the upstream optical network. Multiservice block 320 provides subscriber line interface circuit (SLIC) functionality to support POTS subscriber equipment.

Although the use of a single channel for upstream and downstream communications is a more efficient use of channels per customer, the throughput that may be achieved can be significantly limited as a result of scattering effects. Implementing bi-directional communications on the same channel (i.e., same wavelength) results in degradation of the optical signals as a result of scattering effects such as Rayleigh backscattering. The use of distinct WDM channels as illustrated in FIG. 2 reduces such scattering effects at the price of rapid consumption of channels as well as the logistical costs of selecting the appropriate transmitters and receivers at both the OLT and ONU or ONT network elements.

Figure 4:
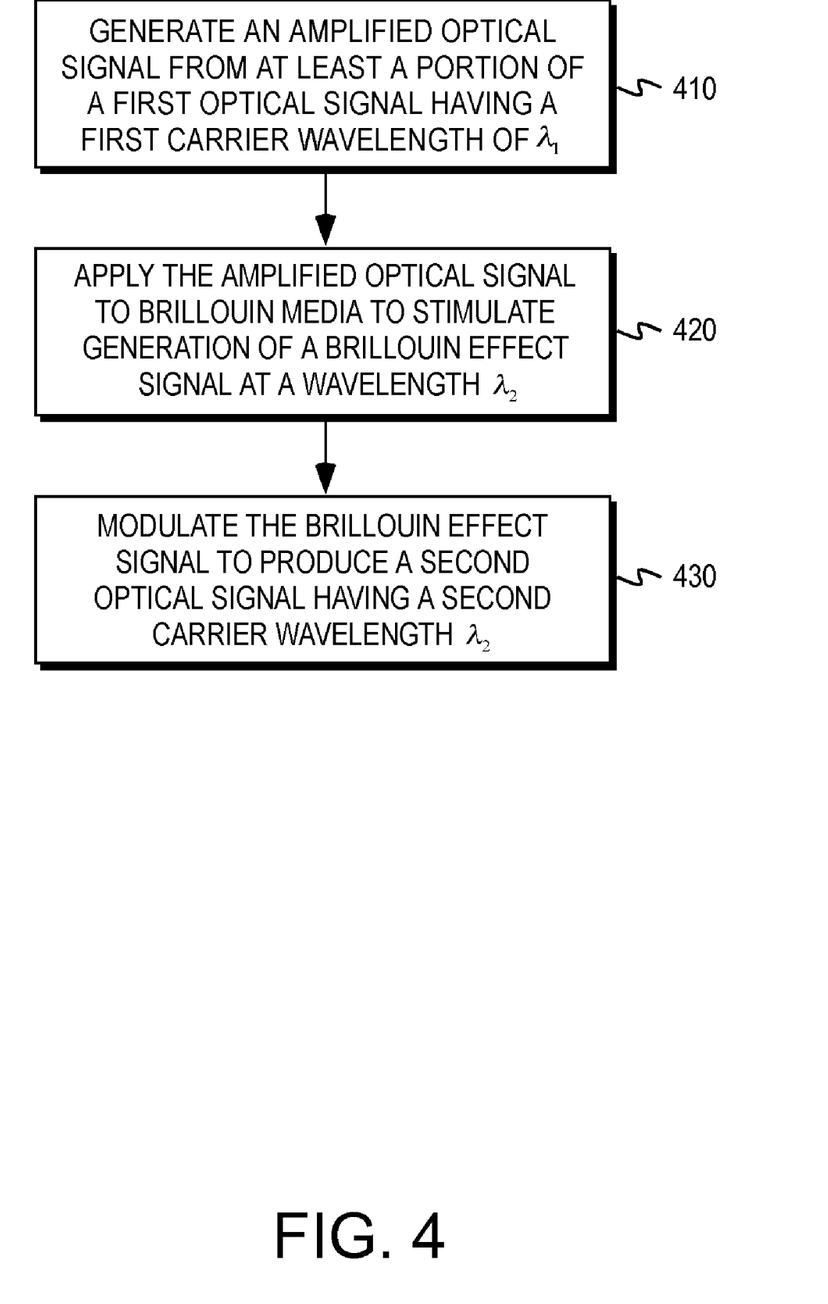
FIG. 4 illustrates one embodiment of a method of optical communications.

FIG. 4 illustrates one embodiment of an alternative method of optical communications. Scattering processes are utilized to increase the throughput of the optical fiber.

An amplified optical signal is generated from at least a portion of a first optical signal having a first carrier wavelength of $\lambda_1$ at 410. In particular an optical power of the received optical signal is increased through amplification. The amplified optical signal is applied to Brillouin media to stimulate generation of a Brillouin effect signal of wavelength $\lambda_2$ at 420. The Brillouin effect signal is modulated to generate a second optical signal having a second carrier wavelength $\lambda_2$ at 430. The first and second carrier wavelengths are substantially distinct (i.e., $\lambda_1 \neq \lambda_2$).

The Brillouin effect media is any media that is susceptible to stimulation of a Brillouin effect signal in response to injection of a stimulating optical signal. The Brillouin effect signal typically propagates in an opposing direction to the propagation of the stimulating optical signal.

In one embodiment, the first optical signal is a received downstream optical signal and the second optical signal is the upstream optical signal. The functions of amplification and modulation may be integrated into a same component such as an optical amplifier or distributed across a plurality of components.

The Brillouin effect is an inelastic scattering of light attributed to interaction of light with acoustic phonons. An electrorestriction effect is created as a result of the optical signal traveling through the Brillouin media. Upon encountering nonlinearities such as changes in refractive index due to electrorestriction, an incident photon can be converted into a scattered photon and an acoustic phonon. The scattered photon typically propagates in a direction opposite that of the incident photon and has a lower energy than the incident photon. Incident photons may also be scattered upon interacting with the resulting acoustic phonons.

Although scattering may occur with incident optical signals of low power, the scattering effect can be nonlinearly enhanced when the optical power of an incident beam of light exceeds a threshold power level (e.g., the stimulated Brillouin scattering threshold). In the case of a continuous wave incident optical signal, the threshold corresponds to a peak power level of the incident optical signal. In the case of a modulated incident optical signal, the threshold is related to the power spectral density of the incident optical signal.

Above the threshold power level, most of the power of an incident beam can be reflected or returned as a counterpropagating Brillouin effect signal. The frequency of the Brillouin effect signal is lower than that of the stimulating light. The wavelength of the Brillouin effect signal is thus higher than that of the stimulating optical signal.

"Brillouin media" is any media that is susceptible to scattering the incident optical signal in such fashion. The shift in frequency and wavelength is determined by characteristics such as the material composition of the media, environmental elements such as temperature and pressure, and the optical frequency or wavelength of the stimulating optical signal. The Brillouin media is a length of optical fiber ("Brillouin fiber") in various embodiments.

Although standard single mode fibers (SSMF) such as SMF-28 are designed in the interest of reducing transmission impairments, the optical fiber composition and specifications can be modified to enhance these nonlinear scattering effects. Such enhancements can lead to reductions in either or both of the length of optical fiber and the incident optical power required to achieve the desired counterpropagating Brillouin effect signal.

The displacement in carrier wavelength (i.e., $\lambda_1-\lambda_2$) achieved via the Brillouin effect can significantly reduce or eliminate the impairment due to the scattering that exists when the same carrier wavelength is utilized for both directions. This is the case irrespective of whether the optical fiber is carrying single channel or WDM communications.

For an optical fiber carrying WDM communications, displacement between the upstream and downstream carriers is less than (or at least not the same as) the spacing between WDM channels to ensure that the scattering effect is not simply translated to another WDM channel. The frequency spacing of WDM channels is 50-100 GHz or greater. The Brillouin effect produces a second carrier within approximately 10-14 GHz of the carrier frequency of the signal used to stimulate the Brillouin effect.

Although the downstream optical signal is a modulated carrier, the physics of the stimulation of the Brillouin effect is such that the incident optical signal is merely the stimulating source and source of energy for the Brillouin effect signal. The Brillouin effect signal will not contain the downstream data nor will it be substantially affected by any modulation of the incident optical signal. However, the modulation results in decreasing the spectral power density of the incident optical signal around the carrier wavelength. Accordingly the SBS threshold is increased. Due to the modulation, the peak power of the stimulating optical carrier prior to modulation must be greater than the stimulated Brillouin scattering threshold required for a continuous wave optical signal. The downstream optical signal can be amplified to meet or exceed the SBS threshold.

One advantage of the method set forth in FIG. 4 is that the process is "colorless". Within the constraints of the materials used, the Brillouin effect results in an optical carrier displaced from the carrier of the optical signal used to stimulate the Brillouin effect. As the carrier wavelength of the stimulating optical signal varies, so does the carrier wavelength of the resulting Brillouin effect signal. Even if the amount of displacement may vary with wavelength, the method or apparatus may be referred to as "colorless" because the shifting effect is achieved for stimulating optical signals in the range of relevant wavelengths.

Figure 5:
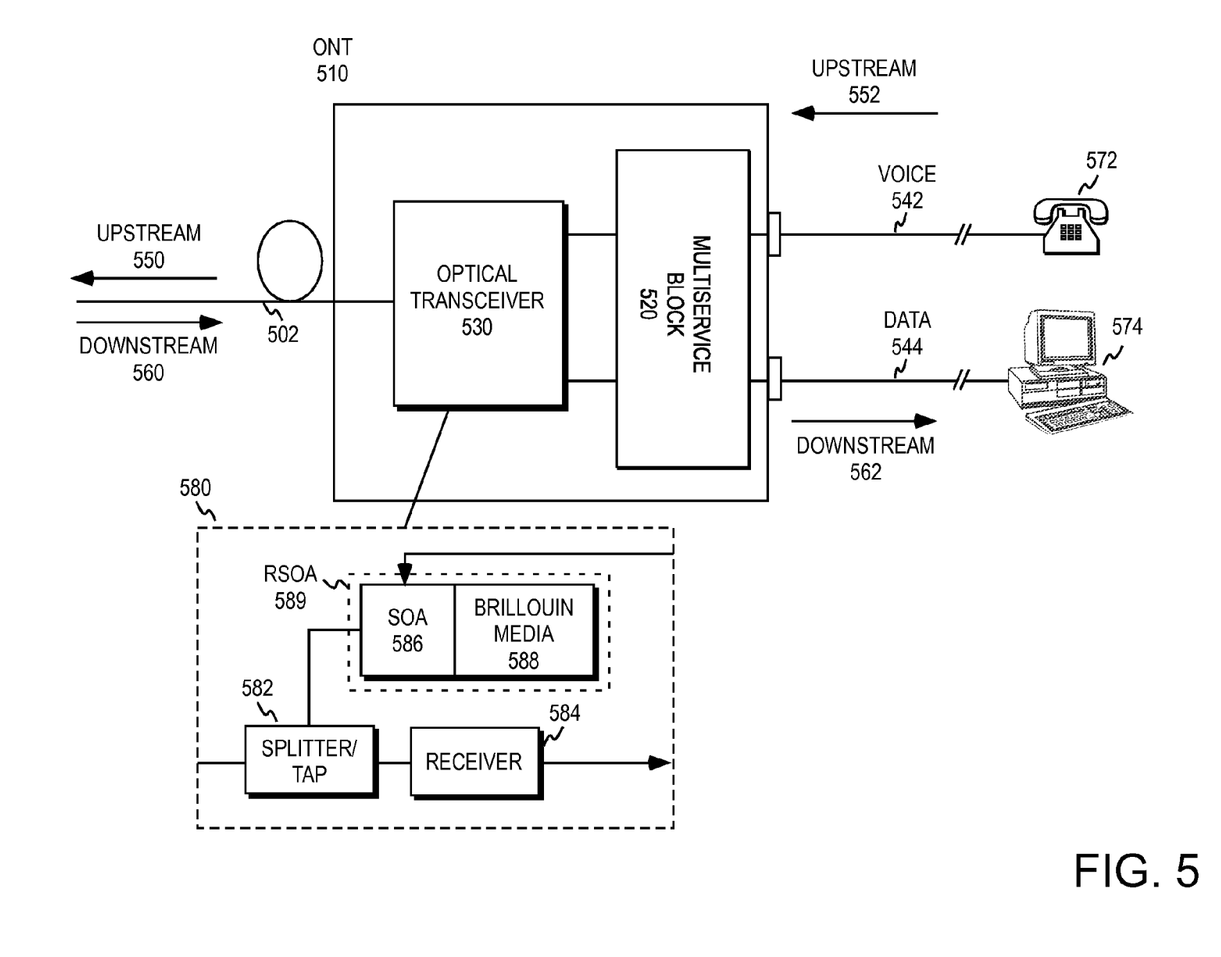
FIG. 5 illustrates one embodiment of an optical network element with an optical transceiver generating an optical signal having a carrier of one wavelength from an optical signal having a carrier of another wavelength.

FIG. 5 illustrates one embodiment of an optical network element with an optical transceiver generating an optical signal having a carrier of one wavelength from an optical signal having a carrier of another wavelength. In one embodiment, the optical network element is an optical network terminal (ONT 510).

Communications (upstream 550 and downstream 560) between the ONT and a central office headend are optical. The optical communications are carried by an optical fiber 502. Communications (upstream 552, downstream 562) between the ONT and subscriber equipment such as computers 574 and telephones 572 are electrical. The electrical signals may be carried by various electrical cabling including telephone wire (voice 542), coaxial cable, or other cabling (data 544). The ONT provides optical-to-electrical and electrical-to-optical conversion as well as other functionality required for interfacing the fiber portion of the network with the electrical portion of the network.

ONT 510 is presumed to be receiving a single channel optical signal rather than a WDM optical signal. If this is not the case, then an n-plexer as set forth in FIGS. 2-3 may be required for extracting the downstream signal associated with this ONT.

The optical fiber is coupled to optical transceiver 530 which provides the electrical-to-optical conversions required for upstream and downstream communications. Downstream optical signals carried by optical fiber 502 are converted to downstream electrical signals and provided to multiservice block 520. Upstream electrical signals provided by multiservice block 520 are converted to upstream optical signals to be carried by optical fiber 502.

In one embodiment, data and voice share the same upstream and downstream channels on the optical fiber 502. The multiservice block demultiplexes time-division-multiplexed (TDM) downstream voice and data communications. The multiservice block time-division-multiplexes upstream voice and data communications from the subscriber equipment. Multiservice block 520 also provides the appropriate electrical interface for the subscriber equipment. For example, multiservice block 520 provides subscriber line interface circuit (SLIC) functionality to support POTS subscriber equipment such as telephone 572.

One embodiment of optical transceiver 530 is set forth in callout 580. Optical fiber 502 is coupled to splitter/tap 582. The splitter/tap leads a portion of the downstream optical signal 550 to an optical amplifier. In the illustrated embodiment, the optical amplifier is a semiconductor optical amplifier (SOA 586). The SOA amplifies the optical signal portion.

The amplified downstream optical signal having a first carrier wavelength of $\lambda_1$ is provided to the Brillouin media 588. In one embodiment, the Brillouin media is a Brillouin optical fiber. The Brillouin media produces a Brillouin effect signal at a wavelength $\lambda_B$ in response to the amplified downstream optical signal. In one embodiment, SOA is a reflective semiconductor amplifier (RSOA) having a Brillouin effect fiber substituted for the mirror. The Brillouin effect signal is modulated to generate the upstream optical signal having a second carrier wavelength $\lambda_2$, where $\lambda_2 = \lambda_B$.

The Brillouin effect signal may in fact consist of a number of spectral components including $\lambda_B$. In one embodiment, $\lambda_B$ represents the spectral component having the greatest power relative to other spectral components of the Brillouin effect signal.

Due to the nature of the Brillouin effect, $\lambda_B$ will be displaced from $\lambda_1$ by an amount $\Delta\lambda_B$. The specific amount of displacement may vary based on a number of factors including the wavelength of the signal used to stimulate the Brillouin effect. The notation $\lambda_i$ may be used to identify a specific carrier wavelength. Accordingly, $\lambda_{Bi}$ refers to the Brillouin effect signal generated in response to application of an optical signal having a carrier wavelength $\lambda_i$. The notation $\Delta\lambda_{Bi}$ refers to the displacement of the Brillouin effect signal from $\lambda_i$.

The displacement is small relative to the carrier wavelength. For a typical wavelength division multiplexed optical signal having a plurality of carriers (e.g., $\lambda_1, \lambda_2, \ldots \lambda_n$), $\Delta\lambda_{Bi}$ tends to be sufficiently small such that $|\Delta\lambda_{Bi}| \ll |\lambda_i - \lambda_{i+1}|$ (i.e., the absolute value of the displacement is much smaller than the distance between adjacent carrier wavelengths).

Assuming $\Delta\lambda_{Bi}$ is positive, this means $\lambda_{i-1} < \lambda_i - \Delta\lambda_{Bi} < \lambda_i < \lambda_i + \lambda_{Bi} < \lambda_{i+1}$ This displacement will occur regardless of different selected $\lambda_1$.

Referring to FIG. 5, the first and second carrier wavelengths are thus substantially distinct (i.e., $\lambda_1 \neq \lambda_2$). In one embodiment the wavelength shift corresponds to a change of 10-14 GHz in the carrier frequency. The upstream optical signal proceeds back along the path to the splitter/tap and is carried upstream by optical fiber 502.

The modulation signal for the Brillouin effect signal is provided by electrical signals from the multiservice block 520. The upstream signal from POTS subscriber equipment such as telephone 572 and data subscriber equipment such as computer 574 is communicated to multiservice block 520 via voice 542 and data 544 subscriber lines. Multiservice block 520 processes the electrical upstream signal to generate a modulation signal for the semiconductor amplifier. In the illustrated embodiment, the modulation signal is superimposed upon the drive current provided to the SOA 586.

The remainder of the downstream signal is provided to receiver 584. Receiver 584, for example, may comprise a reverse-biased PIN diode. Receiver 584 converts the downstream optical signal to a downstream electrical signal provided to multiservice block 520. Multiservice block 520 processes the electrical signals to communicate with telephone 572 and data terminal 574 as needed.

The method set forth in FIG. 4 enables elimination of an optical source such as a light emitting diode or laser for transmitting optical signals. The optical carrier is generated from the received optical signal.

Figure 6:
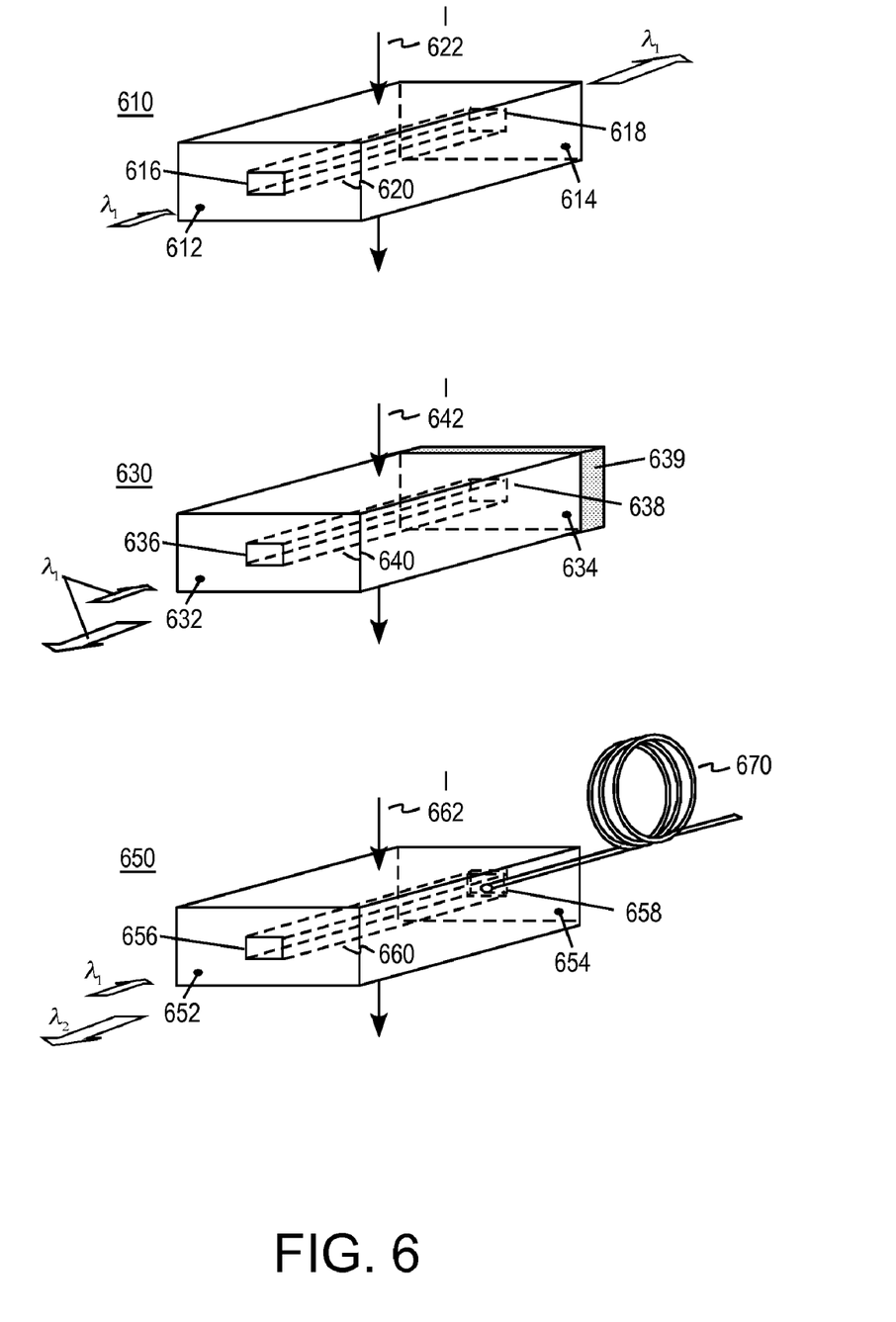
FIG. 6 illustrates various embodiments of semiconductor optical amplifiers.

FIG. 6 illustrates various embodiments of semiconductor optical amplifiers. A conventional semiconductor optical amplifier such as SOA 610 includes a waveguide 620 coupling a first facet 612 and a second facet 614. The first facet includes a front aperture 616. The second facet includes a back aperture 618. An input optical signal entering the waveguide via the front aperture is amplified by the application of current 622 to provide an amplified optical signal exiting the back aperture. The input optical signal and amplified optical signal have the same wavelength, $\lambda_1$.

Another semiconductor optical amplifier such as SOA 630 includes a waveguide 640 coupling a first facet 632 and second facet 634. The first facet includes a front aperture 636. The second facet includes a back aperture 638. A reflective media such as a mirror 639 is optically coupled to the back aperture 638. An input optical signal entering the waveguide via the front aperture is reflected by the mirror and returned by the waveguide to exit the front aperture. The application of current 642 amplifies the input optical signal to provide an amplified optical signal. The input optical signal and amplified optical signal have the same wavelength, $\lambda_1$. SOA 630 is a single port device due to the reflective media. The optical input signal enters the front aperture and the amplified optical signal exits the front aperture. Accordingly such an apparatus is also referred to as a reflective semiconductor optical amplifier (RSOA). An RSOA may be formed from a conventional semiconductor optical amplifier by coupling the back facet to a reflective media such as mirror 639.

A semiconductor optical amplifier such as SOA 650 includes a waveguide 660 coupling a first facet 652 and second facet 654. The first facet includes a front aperture 656. The second facet includes a back aperture 658. The back aperture 638 is coupled to Brillouin media 670. In the illustrated embodiment, Brillouin media 670 is an optical fiber.

An input optical signal entering the waveguide 660 via the front aperture is amplified and injected into the Brillouin media thus stimulating the generation of a backward traveling Brillouin effect signal. The Brillouin effect signal is amplified and returned by the waveguide to exit the front aperture. The application of current 662 amplifies both the input optical signal and the resulting Brillouin effect signal. The input optical signal has a first wavelength and the Brillouin effect signal has a second wavelength. Due to the Brillouin effect of the Brillouin media, the first and second wavelengths are distinct. As a result of the Brillouin media, the SOA 650 is a single port device because the signal of interest is exiting the same port that received the optical input signal. The optical input signal enters the front aperture and the amplified optical signal exits the front aperture. This apparatus may be referred to as an RSOA, however, the "reflection" is a counterpropagating optical signal of a different wavelength than the incident optical signal. Such an RSOA may be formed from a conventional semiconductor optical amplifier by coupling the back facet to the Brillouin media which generates a wavelength-shifted counterpropagating optical signal from an incident optical signal.

For each of semiconductor optical amplifiers 610, 630, and 650, the amplifier drive current (622, 642, 662) may be modulated such that the output optical signal carries the upstream data. Due to their respective mirror or Brillouin media couplings, SOAs 620 and 630 are functionally single port devices because the amplified output signal exits the same port receiving the input optical signal. SOA 610 is a pass-through or two-port device because the amplified output signal exits a port other than the port receiving the input signal.

Figure 7:
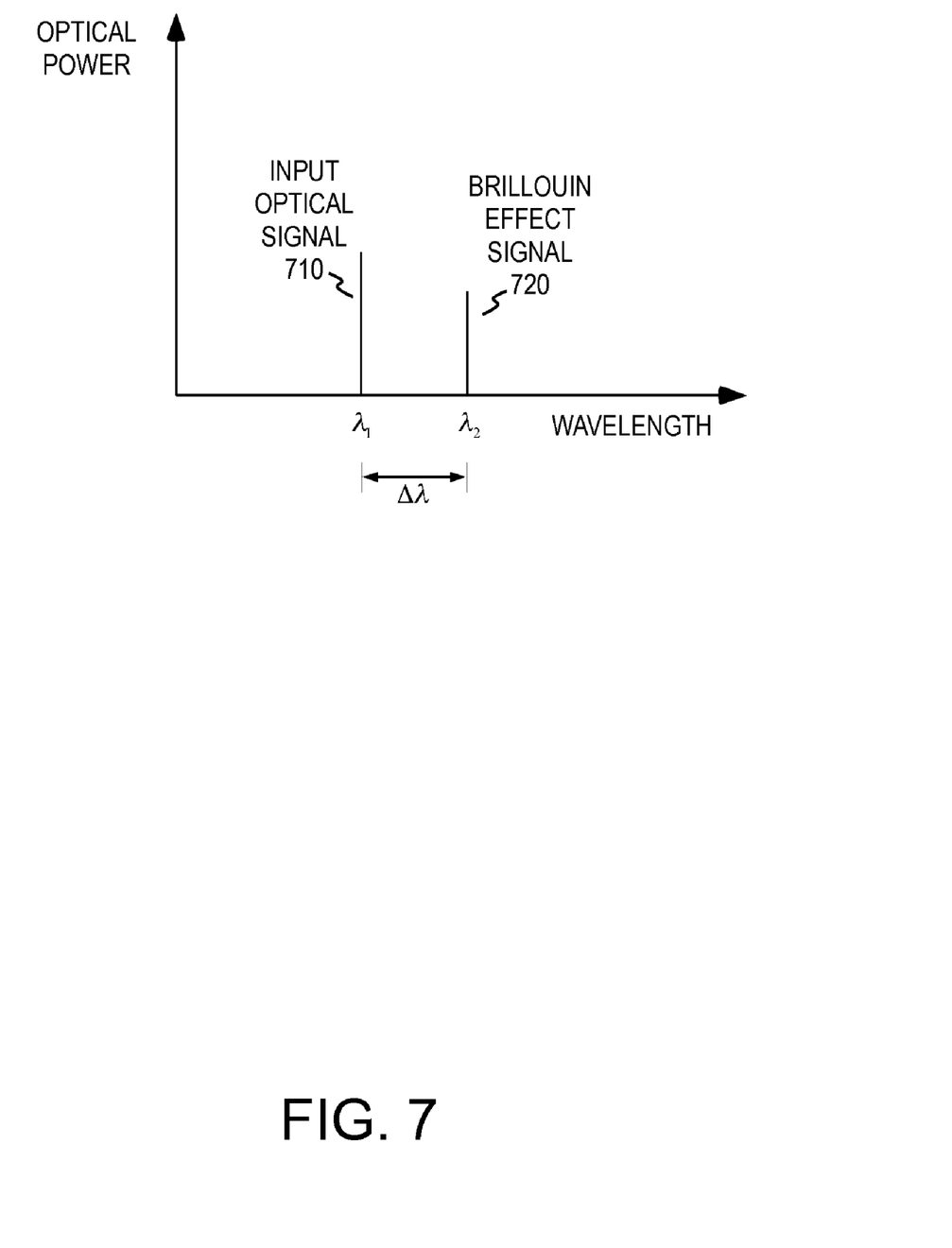
FIG. 7 illustrates one embodiment of an optical signal generated via a stimulated Brillouin effect.

FIG. 7 illustrates one embodiment of the stimulated generation of a Brillouin effect signal from an input optical signal. The input optical signal is identified by a carrier 710 having a first wavelength, $\lambda_1$. The Brillouin effect signal is associated with a carrier 720 having a distinct second wavelength, $\lambda_2$. Given that the input optical signal is modulated with the downstream data (i.e., not a continuous wave input optical signal), the input optical signal and therefore the output optical signal may have additional spectral components. The displacement $\Delta\lambda$ between the Brillouin effect signal and the input optical signal is determined by the properties of the Brillouin media. An increase in wavelength corresponds to a decrease in frequency.

In various embodiments $\Delta\lambda$ corresponds to a difference in frequency in a range of approximately 10-14 GHz. Given that optical frequencies range from approximately 180-790 THz, the change in frequency and wavelength are small. Derivatives may be used to define the relationships for small changes.

Taking the derivative of $$f = \frac{c}{\lambda}$$

leads to $$df = -\frac{c}{\lambda^2} d\lambda.$$

Setting $d\lambda = |\lambda_1 - \lambda_2|$ where $|x|$ is the absolute value of x leads to $$|df| = \frac{c|\lambda_1 - \lambda_2|}{\lambda_1}.$$

Substitution and using the approximate range of 10-14 GHz in one embodiment leads to $$\left|\frac{df}{f}\right| = \left|\frac{d\lambda}{\lambda}\right| \leq 10^{-4}$$

for optical frequencies in the range of 180-790 THz.

The input power required to produce a Brillouin effect signal as strong as a continuous wave input signal is referred to as the stimulated Brillouin scattering (SBS) threshold. Given that the input signal is not a continuous wave (i.e., unmodulated carrier), the SBS threshold is dependent upon characteristics of the Brillouin media as well as the input signal. Given that the threshold is dependent upon the power spectral density of the incident optical signal, the modulation of a continuous wave signal will increase the requisite SBS threshold required of a given Brillouin media.

Although scattering is present to varying degrees in standard optical fibers, an optical fiber with an SBS threshold lower than that of standard single mode fiber (SSMF) may be selected. The lower SBS threshold results in an increased yield of inelastically scattered light compared to the same length of SSMF. This permits a reduction in the length of the optical fiber otherwise required to obtain a suitable Brillouin effect signal from the same input power. Further reductions in the length of the Brillouin fiber require increases in the power of the input optical signal in order to maintain a suitable Brillouin effect signal.

The mode profile of the SOA tends to be smaller than the diameter of the core of an optical fiber. The ratio of SOA aperture size to optical fiber core diameter may also be varied in order to increase the yield of inelastically scattered light. Thus the Brillouin effect may be enhanced by selecting optical fibers having a core diameter more closely matched to the mode profile of the SOA. Given an SOA configured for a typical SSMF core diameter of 4 μm, this implies a Brillouin fiber have a core diameter less than 4 μm. In one embodiment, the Brillouin fiber has a core diameter less than or equal to 2 μm.

In addition to varying the geometry (i.e., length and core diameter), significant changes in the fiber composition may lead to a lower SBS threshold. Instead of fused silica, for example, the Brillouin media may be composed of Chalcogenide glass or photonic crystal. Chalcogenide optical fibers are composed of one or more of sulfur, selenium, or tellurium, in conjunction with one or more elements from Group IV, V, or VI of the periodic table. Photonic crystal fibers exhibit periodic variations in dielectric value along the length of the fiber.

Figure 8:
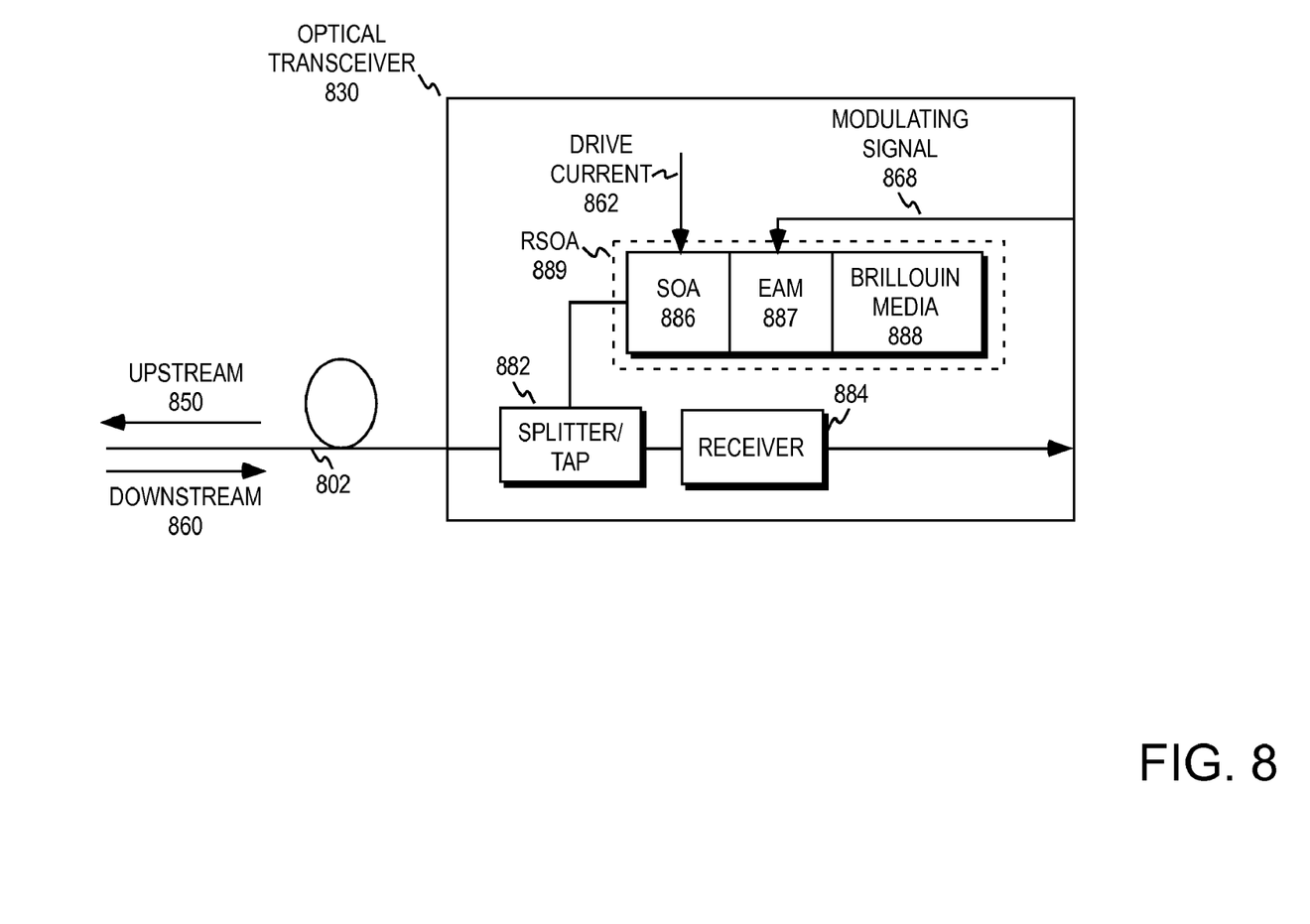
FIG. 8 illustrates an alternative embodiment of an optical transceiver.

FIG. 8 illustrates an alternative embodiment of the optical transceiver of FIG. 5. The modulation and amplification functions are distributed across multiple components. Optical fiber 802 is coupled to splitter/tap 882. The splitter/tap leads a portion of the downstream optical signal 850 to an optical amplifier apparatus. In the illustrated embodiment, the optical amplifier functions as a reflective semiconductor optical amplifier (RSOA 889). RSOA 889 includes a semiconductor optical amplifier (SOA 886) coupled to an electroacoustic modulator (EAM) 887 and Brillouin media 888.

In one embodiment, the downstream optical signal is amplified by the SOA prior to passing through EAM 887. The amplified downstream optical signal has a first carrier wavelength of $\lambda_1$. The amplified downstream optical signal passes through EAM prior to being injected into the Brillouin media 888. In one embodiment, the Brillouin media is a Brillouin optical fiber. The Brillouin media produces a Brillouin effect signal having a second wavelength, $\lambda_2$ in response to the amplified downstream optical signal.

The Brillouin effect signal is traveling in the upstream direction. The Brillouin effect signal is modulated by EAM 887 in accordance with modulating signal 868 provided to EAM 887. The modulating signal may be provided, for example, by a multiservice block such as the multiservice block 520 of FIG. 5. The drive current 862 for SOA 886 is not modulated. SOA 886 amplifies the Brillouin effect signal for upstream transmission. The upstream optical signal has a second carrier wavelength, $\lambda_2$.

In alternative embodiments, the SOA 886 and EAM 887 are coupled such that the downstream optical signal passes through the EAM 887 prior to amplification by the SOA 886 and is then communicated to the Brillouin media 888. The counterpropagating Brillouin effect signal is then amplified by the SOA 886 prior to modulation by EAM 887 to produce the upstream optical signal. The upstream optical signal also has the second carrier wavelength, $\lambda_2$.

The first and second carrier wavelengths are substantially distinct (i.e., $\lambda_1 \neq \lambda_2$). In one embodiment the wavelength shift corresponds to a change of 10-14 GHz in the carrier frequency. The upstream optical signal proceeds back along the path to the splitter/tap and is carried upstream by optical fiber 802.

The remainder of the downstream signal is provided to receiver 884. Receiver 884, for example, may comprise a reverse-biased PIN diode. Receiver 884 converts the downstream optical signal to a downstream electrical signal as described with respect to FIG. 5.

Figure 9:
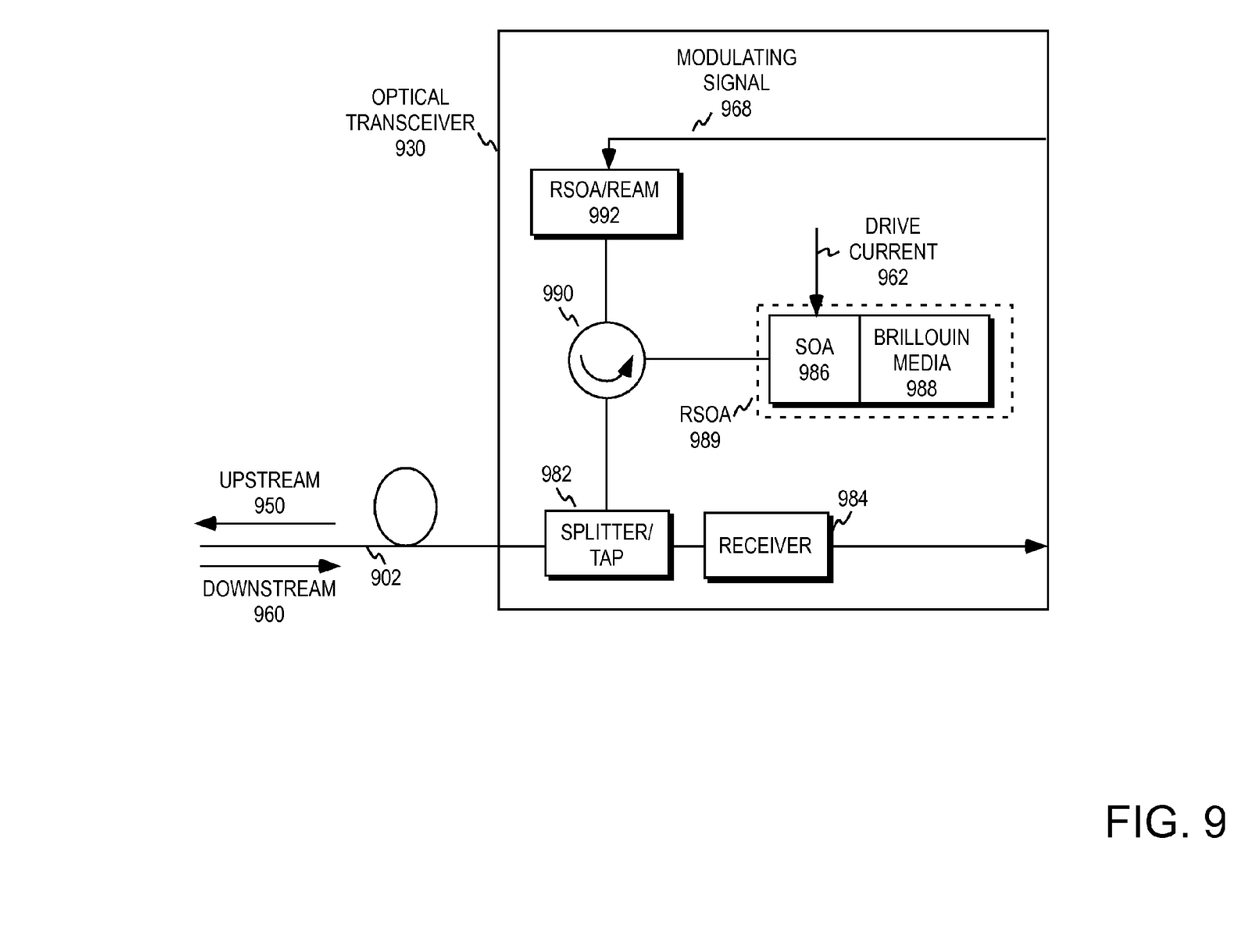
FIG. 9 illustrates another embodiment of an optical transceiver.

FIG. 9 illustrates an alternative embodiment of an optical transceiver of an optical network element. The modulation and amplification functions are distributed across multiple components. Optical fiber 902 is coupled to splitter/tap 982. The splitter/tap leads a portion of the downstream optical signal 950 to an optical amplifier via a circulator 990. In the illustrated embodiment, the optical amplifier is a semiconductor optical amplifier (SOA 986). The SOA amplifies the downstream optical signal portion.

The amplified downstream optical signal has a first carrier wavelength of $\lambda_1$. The amplified downstream optical signal is injected into the Brillouin media 988. In one embodiment, the Brillouin media is a Brillouin optical fiber. The Brillouin media produces a Brillouin effect signal having a second wavelength, $\lambda_2$ in response to the amplified downstream optical signal.

The Brillouin effect signal is traveling in the upstream direction. The Brillouin effect signal is provided to the modulator from SOA 986 via circulator 990. The drive current 962 for SOA 986 is not modulated. SOA 986 amplifies the Brillouin effect signal for upstream transmission. The Brillouin effect signal has a second carrier wavelength, $\lambda_2$. The modulator modulates the Brillouin effect signal in accordance with modulating signal 968. The modulating signal may be provided, for example, by a multiservice block such as the multiservice block 520 of FIG. 5.

In the illustrated embodiment, the modulator is a reflective semiconductor optical amplifier/reflective electroacoustical modulator (RSOA/REAM 992). RSOA/REAM may also amplify the modulated Brillouin effect signal. In the illustrated embodiment, RSOA/REAM 992 is a single port device. The RSOA/REAM 992 generates an upstream optical signal having a second carrier wavelength, $\lambda_2$. This upstream optical signal is communicated back to splitter/tap 984 via circulator 990. The upstream optical signal proceeds back along the path to the splitter/tap and is carried upstream by optical fiber 902.

The first and second carrier wavelengths are substantially distinct (i.e., $\lambda_1 \neq \lambda_2$). In one embodiment the wavelength shift corresponds to a change of 10-14 GHz in the carrier frequency.

The remainder of the downstream signal is provided to receiver 984. Receiver 984, for example, may comprise a reverse-biased PIN diode. Receiver 984 converts the downstream optical signal to a downstream electrical signal as described with respect to FIG. 5.

Figure 10:
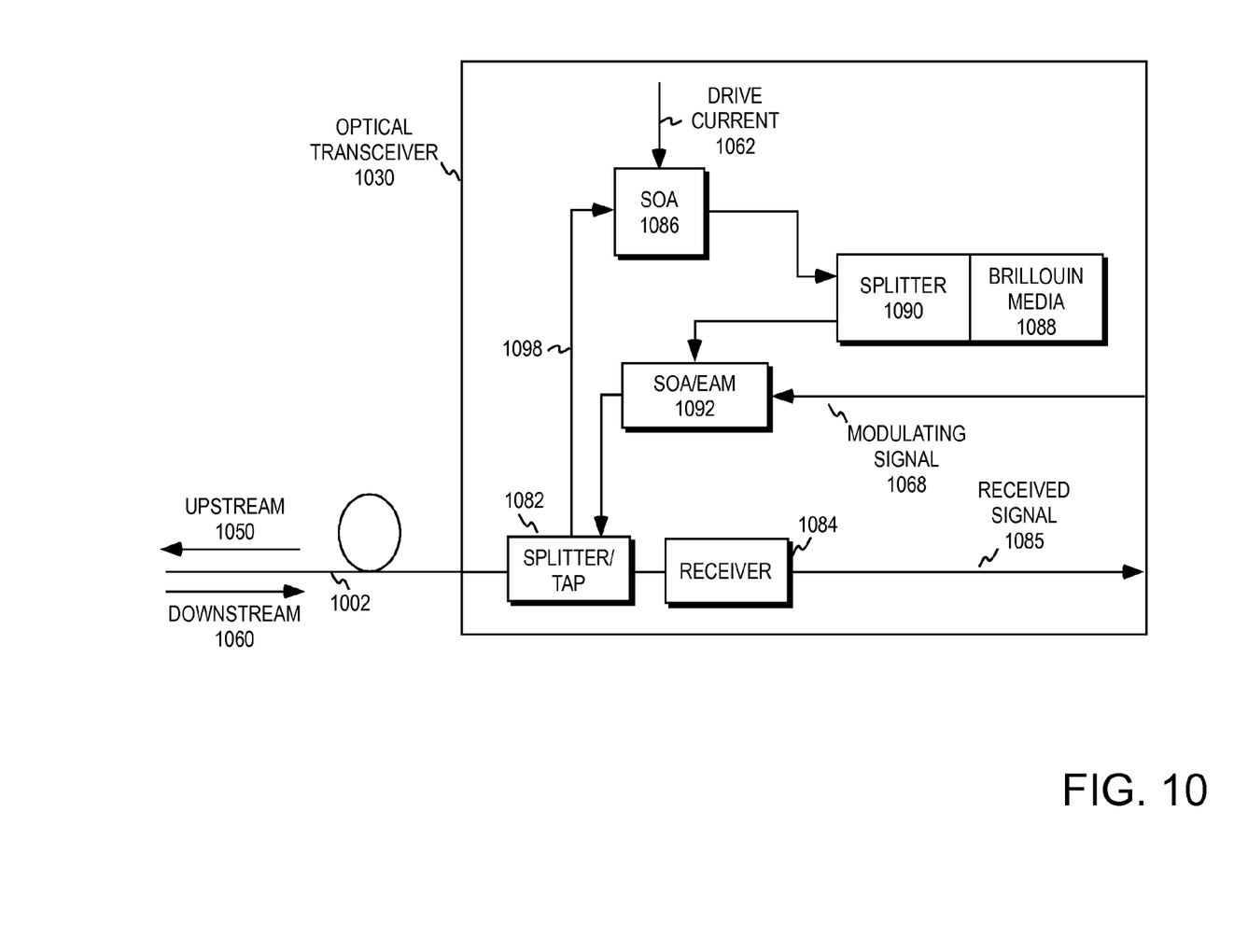
FIG. 10 illustrates another embodiment of an optical transceiver.

FIG. 10 illustrates an alternative embodiment of an optical transceiver of an optical network element. The modulation and amplification functions are distributed across multiple components. Optical fiber 1002 is coupled to splitter/tap 1082. The splitter/tap leads a portion of the downstream optical signal 1050 to an optical amplifier. In the illustrated embodiment, the optical amplifier is a semiconductor optical amplifier (SOA 1086). The SOA amplifies the downstream optical signal portion. The drive current 1062 for SOA 1086 is not modulated.

The amplified downstream optical signal has a first carrier wavelength of $\lambda_1$. The amplified downstream optical signal is injected into the Brillouin media 1088 via splitter 1090. In one embodiment, the Brillouin media is a Brillouin optical fiber. The Brillouin media produces a Brillouin effect signal having a second wavelength, $\lambda_2$ in response to the amplified downstream optical signal.

The Brillouin effect signal propagates to the splitter 1090 which communicates the signal to the modulator. In the illustrated embodiment, the modulator is a semiconductor optical amplifier/electroacoustical modulator (SOA/EAM 1092) to provide amplification in addition to modulation. The modulator modulates the Brillouin effect signal in accordance with modulating signal 1068. The modulating signal may be provided, for example, by a multiservice block such as the multiservice block 520 of FIG. 5. The modulating signal 1068, received signal 1085, and drive current 1062 are electrical in nature. The remaining signals (e.g., 1098) are communicated optically between the illustrated components.

In the illustrated embodiment, SOA/EAM 1092 is a pass-through device. The modulator thus generates an upstream optical signal having a second carrier wavelength, $\lambda_2$. The upstream optical signal proceeds back along the path to the splitter/tap 1084 and is communicated upstream by optical fiber 1002.

The first and second carrier wavelengths are substantially distinct (i.e., $\lambda_1 \neq \lambda_2$). In one embodiment the wavelength shift corresponds to a change of 10-14 GHz in the carrier frequency.

The remainder of the downstream signal is provided to receiver 1084. Receiver 1084, for example, may comprise a reverse-biased PIN diode. Receiver 1084 converts the downstream optical signal to a downstream electrical signal as described with respect to FIG. 5.

Various embodiments of optical network elements utilizing a Brillouin effect to colorlessly generate a second optical signal having a second carrier wavelength from a first optical signal having a first carrier wavelength have been described. The first and second optical signals may be downstream and upstream signals of a passive optical network, respectively.

An optical amplifier is provided to amplify the downstream signal. The amplified optical signal is injected into Brillouin media such as a Brillouin optical fiber. The amplified optical signal stimulates generation of a counter-propagating Brillouin effect signal at a wavelength $\lambda_B$. The Brillouin effect signal is modulated to produce the upstream optical signal with a second carrier wavelength of $\lambda_2$ where $\lambda_2 = \lambda_B$. The modulation and amplification functions may be integrated or distributed among a plurality of components. The upstream optical signal is communicated upstream on the same optical fiber carrying the downstream optical signal. In various embodiments, the optical transceiver may form a portion of a passive optical network ONU or ONT.

In the preceding detailed description, the invention is described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method comprising:
    a) generating an amplified optical signal from a first optical signal having a first carrier wavelength, $\lambda_1$;
    b) applying the amplified optical signal to Brillouin media to stimulate generation of a Brillouin effect signal at a wavelength $\lambda_2$, wherein the Brillouin effect signal is substantially independent of any data carried by the first optical signal; and
    c) modulating the Brillouin effect signal to produce a second optical signal having a second carrier wavelength, $\lambda_2$.

2. The method of claim 1 wherein a) comprises providing the first optical signal to a semiconductor optical amplifier.

3. The method of claim 1 wherein the Brillouin media is an optical fiber.

4. The method of claim 1 wherein at least one of $\lambda_1$ and $\lambda_2$ is in a range corresponding to a frequency range of approximately 180 THz to 790 THz.

5. The method of claim 1 wherein $|\lambda_1 - \lambda_2|$ corresponds to a difference in frequency of approximately 13 GHz.

6. The method of claim 1 wherein $$\frac{|\lambda_1 - \lambda_2|}{\lambda_1} \leq 10^{-4}.$$

7. The method of claim 1 comprising:
    d) communicating the second optical signal along a same optical path traveled by the first optical signal.

8. The method of claim 7 wherein the optical path comprises an optical fiber.

9. The method of claim 8 wherein the optical fiber is a single mode fiber.

10. The method of claim 1 wherein the first optical signal is a downstream optical signal of a passive optical network and the second optical signal is an upstream optical signal of the passive optical network.

11. An apparatus comprising:
    a semiconductor optical amplifier (SOA) generating an amplified optical signal from a first optical signal having a first carrier wavelength, $\lambda_1$;
    a Brillouin media, wherein the SOA is coupled to inject the amplified optical signal into the Brillouin fiber to generate a Brillouin effect signal at wavelength $\lambda_2$, wherein the Brillouin effect signal is substantially independent of any data carried by the first optical signal; and
    a modulator coupled to modulate the Brillouin effect signal to produce a second optical signal having a second carrier wavelength, $\lambda_2$.

12. The apparatus of claim 11 wherein the first optical signal is a downstream optical signal of a passive optical network and the second optical signal is an upstream optical signal of the passive optical network.

13. The apparatus of claim 11 wherein the second optical signal along a same optical path traveled by the first optical signal to the SOA.

14. The method of claim 13 wherein the optical path comprises an optical fiber.

15. The apparatus of claim 11 wherein at least one of $\lambda_1$ and $\lambda_2$ is in a range corresponding to a range of frequencies of approximately 180 THz to 790 THz.

16. The apparatus of claim 11 wherein $|\lambda_1 - \lambda_2|$ corresponds to a difference in frequency of approximately 13 GHz.

17. The apparatus of claim 11 wherein $$\frac{|\lambda_1 - \lambda_2|}{\lambda_1} \leq 10^{-4}.$$

18. The apparatus of claim 11 wherein the semiconductor optical amplifier is also the modulator.

19. The apparatus of claim 11 wherein the semiconductor optical amplifier and the modulator are distinct.

20. The apparatus of claim 19 wherein the modulator is an electroacoustical modulator.

21. The apparatus of claim 11 wherein the Brillouin media is an optical fiber.

* * * * *